United States Patent

Wininger, Jr.

[15] 3,698,096

[45] Oct. 17, 1972

[54] CONTINUOUS PROCESS OF REMOVING SURFACE WATER FROM PLASTIC SHEET MATERIAL

[72] Inventor: John M. Wininger, Jr., Blountville, Tenn.

[73] Assignee: Eastman Kodak Company, Rochester, N.Y.

[22] Filed: Feb. 1, 1971

[21] Appl. No.: 111,462

Related U.S. Application Data

[63] Continuation-in-part of Ser. No. 877,328, Nov. 17, 1969, abandoned.

[52] U.S. Cl..............................................34/9, 34/18
[51] Int. Cl..............................................F26b 3/00
[58] Field of Search...................34/9, 12, 14, 17, 18

[56] References Cited

UNITED STATES PATENTS 2,197,145  4/1940  Engle..............................34/9
2,209,759  7/1940  Berry..............................34/9

Primary Examiner—John J. Camby
Attorney—Cecil D. Quillen, Jr. and George P. Chandler

[57] ABSTRACT

Polyolefin, polyester and cellulose ester plastic sheet products produced at high production rates without optical or visible defects by extruding the plastic in the molten state into a water quench bath, and completely removing surface water from the quenched sheet. This is accomplished according to the instant invention by heating the sheet immediately after it leaves the quench bath to impart internal heat thereto, removing surface water by conveying the wet sheet through a pair of squeeze rolls which hold back the bulk of the excess water and spread any water not thus removed in a layer of minute thickness over both surfaces of the sheet, and thereafter conveying the heated sheet from the exit side of the squeeze rolls for a sufficient distance and a sufficient interval to permit the internal heat previously imparted to the sheet to evaporate all remaining water therefrom.

10 Claims, 2 Drawing Figures

PATENTED OCT 17 1972　　　　　　　　　　　3,698,096

JOHN M. WININGER, JR
INVENTOR

BY *Cecil D. Guthry Jr.*

*George P. Chandler*
ATTORNEY

CONTINUOUS PROCESS OF REMOVING SURFACE WATER FROM PLASTIC SHEET MATERIAL

This application is a continuation-in-part of copending application Ser. No. 877,328, filed Nov. 17, 1969, now abandoned.

This invention relates to a process of removing water from the surface of plastic sheets or films prepared by extrusion of a molten plastic material in sheet form into a water quench bath and wet with water acquired from immersion in said bath. More particularly, the invention relates to a process for complete removal of such surface water from sheets or films prepared in this manner from plastic materials such as polyolefins, exemplified by polyethylene and polypropylene, polyesters such as poly(ethylene terephthalate) or poly(1,4-cyclohexylenedimethylene terephthalate) or plasticized cellulose esters. Still more particularly, the invention relates to removal of surface water from extruded, quenched sheets and films of the type indicated and produced at relatively high linear operating speeds.

Production of plastic sheets or films by extrusion of a molten plastic material in sheet form into a water quench bath is known and has been employed in various manufacturing operations. In many industrial applications in which sheets so produced are employed, the material must be completely free from optical defects and other blemishes due to the presence of small amounts of surface moisture. For example, if moisture is present on either or both surfaces of a water quenched plastic sheet and the sheet is subsequently processed, as for example, in a drawing or tentering operation, those areas of the sheet where moisture has been retained will have different heat transfer characteristics than the remaining areas where no moisture is present, and this will give rise to spots, streaks or other optical defects in the processed material. In addition, such material may vary in tensile strength from one surface area to another. Such variations in tensile strength may be highly disadvantageous as, for example, where a water quenched plastic sheet, which has retained surface moisture, is subsequently slit into ribbons, drafted and wound or otherwise processed into a yarn product such as baler twine. The problems traceable to incomplete moisture removal are rendered even more difficult to deal with when hygroscopic additives such as pigments, dyes, stabilizers and other adjuvants are added to the sheet-forming composition.

Experience has shown that known methods or removing surface water from a water quenched plastic sheet or film, as by squeegeeing, passing the material through squeeze rolls and other mechanical means have proven to be inadequate completely to remove all surface moisture. As will be more fully set forth hereinafter, the present invention provides a means of completely removing this surface moisture in a simple, efficient and highly effective manner.

This invention accordingly has as its principal object to obviate the above mentioned prior art difficulties and to provide a simple, efficient and highly effective process of completely removing water from the surfaces of a sheet or film prepared by extrusion of a molten plastic in sheet form into a water quench bath.

Another object is to provide a continuous process of completely removing water from the surfaces of a plastic polyolefin, polyester or plasticized cellulose ester sheet prepared by extrusion of the molten plastic in sheet form into a water quench bath.

Another object is to provide a continuous process of completely removing water from the surfaces of a plastic polyolefin, polyester or plasticized cellulose ester sheet prepared by extrusion of the molten plastic in sheet form into a water quenching bath which can be operated at higher linear speeds than have heretofore been possible without moisture carryover.

A further object is to provide a process for producing a thin plastic sheet or film, having a thickness of the order of 1–10 mils, and composed of a material such as a polyolefin, a polyester or a plasticized cellulose ester, which by virtue of containing no surface moisture, can be stored for considerable periods of time without deterioration and can be processed in such operations as drawing, tentering, and the like, to product products having uniform tensile strength and free from optical defects.

Other objects will appear hereinafter.

These objects are accomplished by the following invention which, in its broader aspects, comprises a continuous process for producing a moisture-free plastic sheet by extruding a sheet-forming composition through a die to form a continuous sheet, passing the sheet through a quench bath consisting essentially of water in a non-turbulent condition, continuously removing the sheet from the quench bath wet with water acquired therefrom and drying both surfaces of the sheet by imparting heat to the wet surfaces of the sheet, thereafter conveying the heated sheet between squeeze rolls, whereby the bulk of the water is held back from both surfaces of the sheet and the remaining water is evenly spread, by action of the squeeze rolls, over the surfaces of the sheet as it passes between the rolls and thereafter conveying the heated sheet from the exit side of the squeeze rolls and permitting the internal heat previously imparted to the sheet to evaporate off all moisture from the surfaces of the sheet.

The specific manner of imparting the heat to the wet sheet leaving the quench bath may vary depending upon the particular type of plastic material employed to produce the sheet. For example, when employing polypropylene as the sheet-forming material it may be desirable to employ 90 lb. steam directed onto both surfaces of the sheet by means of steam jets. Other heating means such as conventional electrical radiant heaters may be also employed for this purpose. Another expedient, found to be successful when imparting heat to a water quenched plastic cellulose ester sheet material, is to employ a water bath heated to an appropriate temperature. The temperature to be employed should be sufficient to impart to the sheet material being heated a sufficient amount of heat to bring about subsequent evaporation of surface moisture in the final step of the process, but should, in general, be below the softening point of the plastic material of which the sheet is composed.

For example, if the sheet is composed of a polyolefin, the temperature may be from 200° F. to 225° F. If the sheet is produced from a polyester such as poly(ethylene terephthalate) or poly(1,4-cyclohexylenedimethylene terephthalate), the temperature may range from 225° F. to 300° F. If the sheet is made from a plasticized cellulose ester such as acetate, the temperature may range from 160° F. to 225° F. The actual temperature employed in a given case will, as indicated above, be below the softening point of the particular plastic material of which the sheet undergoing heating is composed.

The process of the invention is applicable to water removal from plastic sheets or films of various thicknesses, as for example, sheets or film 1–10 mils in thickness or, in fact, any other practical thickness. The width of the sheet will be governed by the type of use to which the material is ultimately to be put and may range from a few inches to several feet, if desired.

The linear speed of extrusion employed to produce the sheet may also vary widely, as for example, from a few feet per minute to 50, 100, 150 and 200 feet per minute or more, depending upon the operating conditions selected and production requirements. One of the distinguishing features of the invention is that it enables the removal of moisture from sheets or films produced by extrusion and water quenching of plastic material at relatively high linear speeds without moisture carryover. As previously stated in discussion of prior practices, this phenomena of water carryover and the presence of surface moisture in the finished product has been one of the most serious obstacles to successful commercial operation of the type of sheet or film producing process herein described. The present invention is thus distinguished from such prior processes in the fact that it can be successfully operated at linear speeds hitherto unattainable without moisture carryover and the presence of moisture and the ensuing defects in physical properties in the ultimate product or products produced therefrom.

As indicated, the process is applicable to moisture removal from sheets or films produced from many different types of plastic materials, as for example, those produced from polyolefins such as polyethylene, polypropylene, polyesters such as poly(ethylene terephthalate) and poly(1,4-cyclohexylenedimethylene terephthalate) and various plasticized cellulose esters such as plasticized cellulose acetate, as well as other plastic compositions known to those skilled in the art to be suitable for the production of sheets or films of the type herein described.

In the above general description of the invention, reference has been made to supplying additional heat to the quenched sheet or film after it leaves the quench bath. In accordance with the invention, this additional heat is supplied to the sheet material so that, upon emerging from the exit side of the squeeze rolls the material will have sufficient internal heat to cause evaporation of any surface moisture remaining on either or both surfaces of the sheet. So far as is known, the imparting of this additional heat for the purpose of accomplishing evaporation of residual surface moisture from a film produced by extrusion and water quenching is an entirely novel concept.

As will be evident to those skilled in the art, the squeeze rolls perform a double function in the process. First, they push or hold back the bulk (approximately 90–95 percent) of the water present on the surfaces of the wet sheet as it contacts the rolls. This excess water runs back into the quench bath or into the water heating bath, if such a bath is used as the heating means.

Second, they spread or "wet out" any water which may have been carried into the pinch of the rolls in droplet or other form and thus form an extremely thin film or layer of moisture on both surfaces of the sheet as it emerges from the exit side of the rolls, thus effectively facilitating subsequent evaporation of this moisture from the surfaces of the sheet under the influence of the internal heat previously stored in the wet sheet. Although it will be understood that evaporation of surface moisture in this manner takes place almost immediately, the sheet should nevertheless be carried through a sufficient length of run and for a sufficient interval to permit complete evaporation of surface moisture before the sheet comes in contact with any other surface. The time interval and length of run required for complete moisture removal will, of course, vary with the linear speed at which the sheet is extruded. For example, when operating the process at linear speeds of 100–200 feet per minute, the length of the run of the film before contacting any surface such as a guide roll or storage package may be 3 to 6 feet. No hard and fast rule can be laid down governing the length of the run or the time interval, except to state that the length of the run and the time interval should, in a given case, be sufficient to dissipate all of the internal heat in the sheet material and thus to accomplish the desired objective of completely removing all moisture from the surfaces of the sheet.

According to one aspect of this invention, there is provided a continuous process for producing a plastic sheet comprising extruding a sheet-forming composition through a die to form a continuous sheet, passing it through a liquid consisting essentially of water in a nonturbulent condition, removing from the liquid the continuous sheet having a wet surface, and drying said surface, the improvement which comprises drying said surface by:

1. imparting heat to the wet surface of said sheet, thereafter,
2. conveying the heated sheet between squeeze rolls, whereby a substantial proportion of said liquid is held back from both surfaces of the sheet and remaining liquid is spread evenly on the surfaces which have passed between said squeeze rolls, and thereafter.
3. conveying the heated sheet from the exit side of said squeeze rolls for a sufficient interval to enable the internal heat previously imparted to the sheet to evaporate said remaining liquid from the sheet.

The invention will be more readily understood by reference to the accompanying drawings in which.

Figure 1:
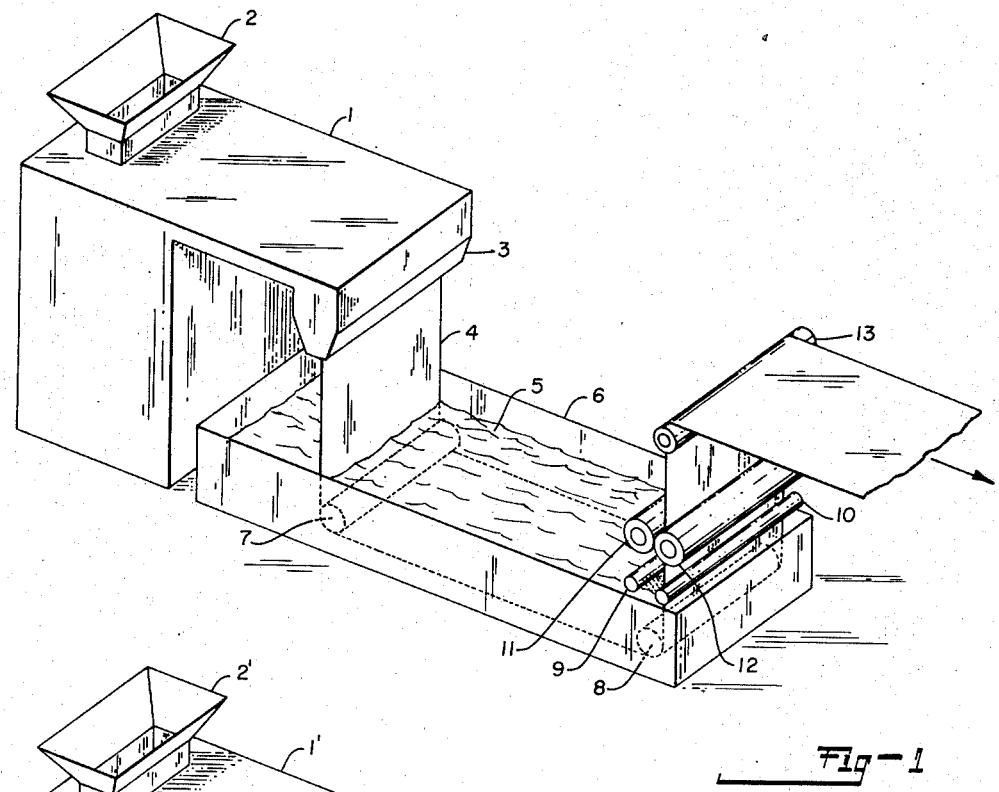
FIG. 1 is a perspective view, in flow sheet form, illustrating how the invention may be carried out in completely removing water from the surfaces of a plastic sheet or film which has been produced, for example, by extruding a molten polyolefin, such as polypropylene, in sheet form, into a water quench bath.

Referring to FIG. 1, the numeral 1 designates a conventional electrically heated extruder which may be provided with a screw conveyor of any selected length and diameter (not shown). Pellets of the selected plastic material, such as ⅛ inch pellets of polypropylene, may be fed to the extruder through hopper 2. Numeral 3 designates an extrusion die which may have a rectangular extrusion orifice of appropriate dimensions to produce an extruded sheet of required width and thickness. If the plastic material is composed of polyethylene pellets, the screw conveyor may conveniently have a 1 ¾ inch diameter and a ratio of length to diameter of 24:1, and the extrusion orifice of the die may be 7 inches by 20 mils which will give an extruded sheet of about 5 mils in thickness. When employing polypropylene pellets as the sheet-forming material the hopper may be heated by appropriate electrical means (not shown) bringing polypropylene to its melt temperature of approximately 450° F.

In operation the screw conveyor is set in motion and extrudes the molten plastic material through the die orifice to produce a sheet 4 having a thickness of about 5 mils. Sheet 4 than passes into a heated water quench bath 5 contained in trough or tank 6. The temperature of the bath may, for example, be maintained at about 90°F. Sheet 4 passes from die 3 into contact with a guide roll 7 thence through bath 5 to a second guide roll 8.

From guide roll 8 sheet 4 passes between steam jets 9 and 10, disposed one on each side of sheet 4 and in close proximity to the surfaces thereof, as shown. Ninety pounds steam is fed from steam jets 9 and 10 directly into contact with both surfaces of sheet 4, thus imparting additional heat thereto. Sheet 4, thus heated and bearing excess water picked up from quench bath 5, passes between squeeze rolls 11 and 12 (independently driven by means not shown), one of which may have a smooth polished metal surface and the other of which may have a smooth rubber surface. Excess water present on the surface of sheet 4 is pushed back by the rolls and runs by gravity back into quench bath 5.

Sheet 4, upon emerging from squeeze rolls 11 and 12, passes through a short run, depending upon the speed of extrusion, sufficient to permit the heat, imparted to the sheet by steam jets 9 and 10, to evaporate off all moisture on both surfaces of the sheet before it is carried over guide roll 13. Upon leaving guide roll 13 the completely dry sheet may pass directly to a processing step such as slitting, drawing, tentering and the like, or may be wound into a package on a storage roll.

Figure 2:
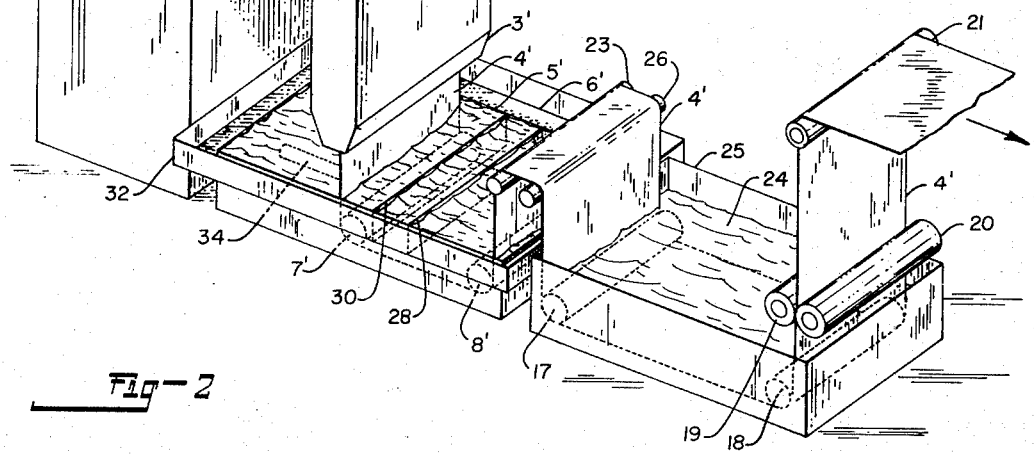
FIG. 2 is a perspective view, also in flow sheet form, illustrating how the invention may be carried out to remove water from the surfaces of a plastic sheet or film which has been produced by extruding a molten plasticized cellulose ester, such as a plasticized cellulose acetate, in sheet form, into a water quench bath.

Referring to FIG. 2, numerals 1', 2', 3', 4', 5', 6', 7', and 8' designate element of the sheet-forming apparatus which are identical with those of the apparatus as shown in FIG. 1, except a minimum air gap between the orifice of the die 3' and the bath 5' is desirable. One to 2 inches has been found satisfactory with one to 1 and ½ inches preferred. The apparatus of FIG. 2 is particularly adapted for production of an extruded and water quenched sheet from a plasticized cellulose ester composition. The heating step in this instance is provided through the agency of a heated water bath 24 contained in trough or tank 25. As shown, sheet 4', after emerging from water quench bath 5', passes over idle roll 23, then over another idle roll 26 and then under guide rolls 17 and 18 immersed in the heated water bath. After leaving guide roll 18 the wet sheet passes between squeeze rolls 19 and 20 (independently driven by means not shown). As in the apparatus of FIG. 1, one of these rolls 19 and 20 may have a smooth polished metal surface while the other may have a smooth rubber surface. The function of these rolls is the same as that of rolls 11 and 12 of FIG. 1, namely, to push or hold back 90 to 95 percent of the water on the wet sheet and thus to spread or "wet out" any remaining water on the surfaces of the sheet as it passes from the exit side of rolls 19 and 20.

A sufficient length of run of sheet 4', before the sheet is carried over idle roll 21, is provided to permit ample opportunity (sufficient interval of distance and time) for the internal heat imparted to the film from heating bath 24 to evaporate off any surface moisture before the sheet contacts the idler roll. As in the process depicted in FIG. 1, the moisture-free sheet produced as shown in FIG. 2 may then pass directly to a processing operation or can be wound into a package on a storage roll.

An advantage of a water bath quench system lies in its ability to rapidly quench the molten extrudate so that high production speeds may be obtained. The water entry point must provide a laminar surface with good heat transfer in order to realize this advantage. Such a laminar surface at the entry point can be achieved by maintaining the water bath 5' in as near a non-turbulent state as possible.

In order to minimize water turbulence, baffles 28 and 30 are provided immediately adjacent the exit and entry points respectively. An overflow system including spillway 32 is provided to minimize water surface movement. A highly diffused, non-turbulent tank water input is achieved by wrapping apertured inlet pipe 34 with 100 mesh screen.

The heating step provided in the heated water bath 24 gives the sheet 4' sufficient internal heat to evaporate the 5 to 10 percent water carryover remaining after it passes through rolls 19 and 20. For example, at a line speed of 75 fpm., maintaining the sheet 4 in the bath 24 for about 3 feet is sufficient. In addition, a 3 to 4 foot run of sheet in a bath heated to approximately 175° F. provides additional shrinkage to flatten the sheet.

The sequence of process steps outlined above has been found to be particularly advantageous in increasing the production rate of cellulose ester film. The conventional chill roll stack method and apparatus for producing films of cellulose esters has been seen to reach a line speed limitation of 30 to 35 feet per minute (fpm.) because of air patching.

By using the process set forth above, however, films of cellulose esters can be produced at speeds of 75 fpm. The advantageous and production economies of doubling the production rate of quality film are obvious.

The following examples are included for a better understanding of the invention.

EXAMPLE 1

This example illustrates the practice of the present invention when applied to the production of a plastic sheet by extrusion in sheet form of molten polypropylene, a typical polyolefin type sheet-forming material, followed by water bath quenching. The apparatus employed for production of a polypropylene sheet in this manner is a conventional electrically heated extruder, such as that shown in FIG. 1 of the accompanying drawing. This extruder is provided with a 1 ¾ inch diameter screw conveyor having a ratio of length to diameter of 24:1 and also provided with an extrusion die having a 7 inch by 20 mils rectangular extrusion orifice which, when employing polypropylene, will give an extruded sheet of about 5 mils in thickness.

The extruder is charged with ⅛ inch polypropylene pellets which, under the influence of the heat supplied to the extruder, will form a molten mass at the melt temperature of approximately 450° F. The polypropylene has a density of 0.902 g/cc (ASTM D1505), a Vicat softening point of 145° C. (ASTM D1525), and a flow rate of 230° C. and 2.16 kg load of 4.5 g/10 min. (ASTM D1238). The screw conveyor is then operated at such a rate as to cause the extruded sheet to emerge from the die orifice at the desired linear speed, as for example, 70 to 100 feet per minute. The sheet then passes into a water bath maintained at approximately 90° F. Upon emerging from the water bath additional heat is applied to the sheet by means of a blast of 90 lb. (psi) of saturated steam directed onto both surfaces of the sheet through steam jets placed a short distance above the water bath. The sheet is then carried between squeeze rolls, one of which is provided with a metal surface and the other of which is provided with a smooth rubber surface. These rolls are independently driven at approximately the speed of extrusion and serve to hold back the bulk of the surface water which is permitted to run back into the water bath. Any remaining water in droplet or other form is immediately spread or wet out on the surfaces of the sheet when it passes into the nip of the squeeze rolls. Upon emerging from the exit side of the squeeze rolls any water carryover will be present as a very thin layer of moisture spread evenly over the surfaces of the sheet and the heat previously stored in the body of the sheet by the heating step acts immediately to evaporate all of the surface moisture from both surfaces of the sheet and a completely moisture-free polypropylene sheet is thus obtained.

It is found that polypropylene sheet material produced in this manner can be successfully processed in such operations as drawing, slitting, tentering and the like, without development of optical blemishes and other defects normally found in sheeting which has retained surface moisture from the quenching step. Likewise, the material can be successfully stored for long periods of time without development of such defects due to any effects caused by water on the surface.

EXAMPLE 2

This example illustrates the practice of the invention when applied to the production of a plastic sheet by extrusion in sheet form of a molten plasticized cellulose acetate (38–40 percent acetyl, plasticized with a combination of dimethoxyethyl phthalate and triphenyl phosphate) extrusion molding composition followed by water bath quenching. The procedure is carried out in a type of apparatus basically the same as that employed in Example 1 but modified as shown more specifically in FIG. 2 of the drawing by the addition of a second water bath to supply additional heat and film shrinkage. In this case the screw conveyor of the extruder is 4 ½ inch in diameter and has a ratio of length to diameter of 20:1, and the extrusion die has a 20 inch by 20 mil extrusion orifice.

The cellulose acetate composition, in the form of ⅛ inch pellets, is heated to its melt temperature of approximately 430° F. and the molten material extruded in sheet form at a linear line speed of 50 feet per minute. Upon emerging from the extrusion orifice the material descends into and is carried through a water quench bath heated to 90° F. As indicated above, additional heat is applied to the sheet emerging from the quench bath by carrying the sheet into a second water bath maintained at a temperature of about 180° F. The sheet runs in this bath for about 3 feet. Upon leaving this second bath the sheet passes immediately to a set of driven squeeze rolls, one of which has a smooth metal surface and the other of which has a smooth rubber covering. As in Example 1, these driven rolls serve to hold back the bulk of the surface water which is permitted to run back into the second water bath. Any remaining water in droplet or other form is spread or wet out on the surfaces of the sheet immediately upon passing into the nip of the squeeze rolls. Upon emerging from the exit side of the squeeze rolls any water carryover will be present as a very thin layer of moisture spread evenly over the surfaces of the sheet. The heat previously stored in the body of the sheet by the heating step then immediately evaporates all of the surface moisture from both surfaces of the sheet and a completely moisture-free cellulose acetate sheet is thus obtained. As is the case with the sheet material produced in accordance with Example 1, the cellulose acetate sheet produced as just described can be successfully processed and stored without the development of optical or other visible defects due to any effects caused by water on the surface.

EXAMPLES 3 – 10

Cellulose acetate butyrate (37 percent butyryl, 13 percent acetyl, plasticized with dibutyl sebacate) is extruded into a film as described in Example 2 using the apparatus illustrated in FIG. 2 but under the conditions set forth in Table I below. In each instance the film is in the heated bath for about 3 feet. In each instance no optical or visible defects caused by water carryover are produced on the surface of the film.

TABLE I

| Example | 3 | 4 | 5 | 6 | 7 | 8 | 9 | 10 |
|---|---|---|---|---|---|---|---|---|
| Melt Temperature, °F. | 425 | 450 | 425 | 450 | 425 | 425 | 450 | 450 |
| Line Speed, fpm. | 75 | 75 | 75 | 75 | 75 | 75 | 75 | 75 |
| Die Opening, Mils | 25 | 25 | 25 | 25 | 50 | 50 | 50 | 50 |
| Quench Temperature, °F. | 74 | 74 | 130 | 130 | 78 | 100 | 110 | 75 |
| Heat Treatment, °F. | 180 | 180 | 180 | 180 | 180 | 180 | 180 | 180 |

EXAMPLES 11 – 18

Cellulose acetate (38–40 percent acetyl, plasticized with a combination of dimethoxyethyl phthalate and triphenyl phosphate), is extruded into a film as described in Example 2 and using the apparatus illustrated in FIG. 2 but under the conditions set forth in Table II below. The film remains in the heated bath 24 for a distance of about 3 feet. In each instance no optical or visible defects caused by water carryover are produced on the surface of the film.

TABLE II

| Example | 11 | 12 | 13 | 14 | 15 | 16 | 17 | 18 |
|---|---|---|---|---|---|---|---|---|
| Melt Temperature, °F. | 425 | 450 | 425 | 450 | 425 | 425 | 450 | 450 |
| Line Speed, fpm. | 75 | 75 | 75 | 75 | 75 | 75 | 75 | 75 |
| Die Opening, mils | 25 | 25 | 25 | 25 | 50 | 50 | 50 | 50 |
| Quench Temperature, °F. | 74 | 74 | 130 | 130 | 78 | 100 | 110 | 75 |
| Heat Treatment, °F. | 180 | 180 | 180 | 180 | 180 | 180 | 180 | 180 |

EXAMPLES 19 – 26

Cellulose acetate propionate (45 percent propionyl, 2.5 percent acetyl) is extruded into a film as described in Example 2 and using the apparatus illustrated in FIG. 2 but under the conditions and utilizing the plasticizers set forth in Table III below. The film remains in the heated bath for a distance of about 3 feet. In each instance no optical or visible defects caused by water carryover are produced on the surface of the film.

TABLE III

| Example | 19 | 20 | 21 | 22 | 23 | 24 | 25 | 26 |
|---|---|---|---|---|---|---|---|---|
| Plasticizer | a b | a b | a c | a b | b | c | d | di-butyl sebacate |
| Melt Temperature, °F. | 440 | 430 | 430 | 430 | 440 | 440 | 430 | 430 |
| Line Speed, fpm. | 75 | 75 | 75 | 75 | 75 | 75 | 75 | 75 |
| Die Opening, mils | 30 | 30 | 30 | 30 | 30 | 30 | 30 | 25 |
| Quench Temperature, °F. | 140 | 140 | 115 | 130 | 110 | 110 | 110 | 120 |
| Heat Treatment, °F. | 185 | 165 | 185 | 170 | 190 | 200 | 190 | 180 | a di-2-ethylhexyl phthalate
b 2,2,4-trimethylpentanediol 1,3-diisobutyrate
c dibutyl azelate
d triethyleneglycol di(2-ethylisohexoate)

EXAMPLE 27

Cellulose acetate propionate (41 percent propionyl, 7 percent acetyl) containing a combination of di-2-ethyl hexyl phthalate and 2,2,4-trimethylpentanediol 1,3-diisobutyrate as a plasticizer is extruded into a 10 mil thick film utilizing the apparatus shown in FIG. 2 under the following conditions.

| | |
|---|---|
| Melt Temperature | 420°F. |
| Line Speed | 75 fpm. |
| Quench Bath Temperature | 140°F. |
| Heat Treatment Temperature | 180°F. |

The film is in the heated bath 24 for a distance of about 3 feet. The film thus produced had no optical or visible defects caused by water carryover.

We have found also that the solubility of the plasticizer in the cellulose ester affects the appearance of the film. Plasticizers which are relatively insoluble in the film forming material product "plasticizer spots" in the finished product. For example, repeating the exact procedure of Example 27 results in a spotted product where the only plasticizer is the relatively insoluble di-2-ethyl hexyl phthalate. Addition of a minor amount (4 parts) of 2,2,4-trimethylpentanediol 1,3-diisobutyrate to the di-2-ethyl hexyl phthalate (14 parts) increases the solubility of the latter sufficiently to result in a satisfactory product.

It will thus be seen from the above examples and description that the present invention provides a simple, effective, highly efficient and useful process for producing extruded and water quenched plastic sheet material completely free from surface moisture and capable of being stored and processed without development of optical defects and deterioration of physical properties due to any effects caused by water on the surface. The invention is also particularly distinguished by the fact that it provides a process for producing such products at operating speeds which have hitherto been unattainable.

Although the invention has been described in considerable detail with reference to certain preferred embodiments thereof, it will be understood that variations and modifications can be effected without departing from the spirit and scope of the invention as described hereinabove.

I claim:

1. In a continuous process for producing a plastic sheet having no optical or visible defects comprising extruding a sheet-forming composition through a die into a liquid consisting essentially of water in a non-turbulent condition to form a continuous sheet, removing the continuous sheet from the liquid, and drying the surface of said sheet, the improvement which comprises drying said surface by:
   1. imparting internal heat to said sheet, thereafter,
   2. conveying the heated sheet between squeeze rolls, whereby a substantial proportion of said liquid is removed from the surface of the sheet and remaining liquid is spread evenly on the surface, and thereafter
   3. conveying the heated sheet from the squeeze rolls for a sufficient interval to enable the internal heat previously imparted to the sheet to evaporate said remaining liquid from the sheet.

2. The process of claim 1 in which the sheet-forming composition is a polyolefin, a polyester or a plasticized cellulose ester.

3. The process of claim 2 in which the sheet-forming composition is polypropylene and heat is imparted to the wet polypropylene sheet by contacting the sheet with steam.

4. The process of claim 1 in which the sheet-forming composition is a plasticized cellulose ester and heat is imparted to the sheet by immersion in a heated water bath maintained at a temperature of from about 160° F. to 225° F.

5. The process of claim 1 wherein the sheet-forming composition is plasticized cellulose acetate, cellulose acetate butyrate, or cellulose acetate propionate, and heat is imparted to the sheet by immersion in a heated water bath maintained at a temperature of from about 160° F. to 225° F.

6. The process of claim 5 wherein the line speed of the sheet-forming process is about 75 feet per minute.

7. The process of claim 6 wherein the sheet is maintained in the heated water bath for a distance of about 3 feet.

8. The process of claim 7 wherein the heated water bath is maintained at a temperature of from about 165° F. to 200° F.

9. The process of claim 8 wherein the plasticizer is dimethoxyethyl phthalate, triphenyl phosphate, dibutyl sebacate, 2,2,4-trimethylpentanediol 1,3-diisobutyrate, dibutyl azelate, triethyleneglycol di(2-ethylisohexoate) or di-2-ethyl hexyl phthalate combined with another plasticizer.

10. The process of claim 8 wherein the temperature of the heated water bath is about 180° F.

* * * * *